United States Patent
Caplan

(10) Patent No.: US 10,574,508 B1
(45) Date of Patent: Feb. 25, 2020

(54) MAPREDUCE OPTIMIZATION FOR PARTITIONED INTERMEDIATE OUTPUT

(71) Applicant: Amazon Technologies, Inc., Reno, NV (US)

(72) Inventor: Joshua Elliot Caplan, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 182 days.

(21) Appl. No.: 14/165,110

(22) Filed: Jan. 27, 2014

(51) Int. Cl.
*H04L 12/24* (2006.01)

(52) U.S. Cl.
CPC .................................. *H04L 41/042* (2013.01)

(58) Field of Classification Search
None
See application file for complete search history.

(56) References Cited

U.S. PATENT DOCUMENTS

| | | | |
|---|---|---|---|
| 8,185,561 B1 | 5/2012 | Datar et al. | |
| 8,190,610 B2 | 5/2012 | Dasdan et al. | |
| 8,224,825 B2 | 7/2012 | Wang et al. | |
| 8,239,847 B2 | 8/2012 | Yu et al. | |
| 2008/0086442 A1* | 4/2008 | Dasdan | G06F 17/30584 |
| 2013/0332931 A1* | 12/2013 | Malewicz | G06F 7/38 |
| | | | 718/102 |
| 2015/0150018 A1* | 5/2015 | Hu | G06F 12/00 |
| | | | 718/103 |
| 2015/0200867 A1* | 7/2015 | Dutta | H04L 49/3045 |
| | | | 709/226 |

OTHER PUBLICATIONS

Jeffrey Dean and Sanjay Ghemawat, "MapReduce: Simplified Data Processing on Large Clusters," OSDI '04, pp. 137-149, USENIX Association, Nov. 2004, Source: https://www.usenix.org/legacy/events/osdi04/tech/full_papers/dean/dean.pdf.

* cited by examiner

*Primary Examiner* — Lance Leonard Barry
*Assistant Examiner* — Mohammad Yousuf A. Mian
(74) *Attorney, Agent, or Firm* — Robert C. Kowert; Kowert, Hood, Munyon, Rankin & Goetzel, P..C

(57) ABSTRACT

Methods and systems for performing MapReduce optimization for partitioned intermediate output are disclosed. Partitions of a set of input data are provided to a plurality of worker nodes. Each worker node performs a first stage of computation on a respective partition of the input data to produce a respective partition of intermediate output data. Each worker node performs a sort operation on the respective partition of intermediate output data to produce a respective partition of sorted intermediate output data. Each worker node performs a second stage of computation on the respective partition of sorted intermediate output data to produce a respective partition of final output data.

18 Claims, 9 Drawing Sheets

MAPREDUCE OPTIMIZATION FOR PARTITIONED INTERMEDIATE OUTPUT

BACKGROUND

Many companies and other organizations operate computer networks that interconnect numerous computing systems to support their operations, such as with the computing systems being co-located or instead located in multiple distinct geographical locations (e.g., connected via one or more private or public intermediate networks). For example, data centers housing significant numbers of interconnected computing systems have become commonplace, such as private data centers that are operated by and on behalf of a single organization and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. As the scale and scope of typical data centers has increased, the tasks of provisioning, administering, and managing the physical computing resources have become increasingly complicated.

Examples of such large-scale systems include online merchants, internet service providers, online businesses such as photo processing services, corporate networks, cloud computing services, web-based hosting services, etc. These entities may maintain computing resources in the form of large numbers of computing devices (e.g., thousands of hosts) which are hosted in geographically separate locations and which are configured to process large quantities (e.g., millions) of transactions daily or even hourly. Such large-scale systems may collect vast amounts of data that require processing.

A conventional approach for harnessing these resources to process data is the MapReduce model for distributed, parallel computing. In a MapReduce system, a large data set may be split into smaller chunks, and the smaller chunks may be distributed to multiple nodes in a cluster for the initial "map" stage of processing. Multiple nodes may also carry out a second "reduce" stage of processing based on the results of the map stage. In a conventional MapReduce implementation, between the map stage and the reduce stage, intermediate results are "shuffled" across a network from map nodes to reducer nodes. The use of network resources in this manner may be expensive, and the shuffle operation may be time-consuming.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods and systems for performing MapReduce optimization for partitioned intermediate output are described. Using the methods and systems as described herein, single-host MapReduce clusters may be used to optimize a shuffle operation between a map stage and a reduce stage. Intermediate output produced by the map stage may be partitioned such that re-partitioning is not necessary. The partitioned intermediate output may be kept on the same worker node for further processing in the reduce stage. In this manner, the use of network resources may be minimized or eliminated altogether for the transfer of partitioned intermediate results between the map stage and the reduce stage.

Figure 1A:
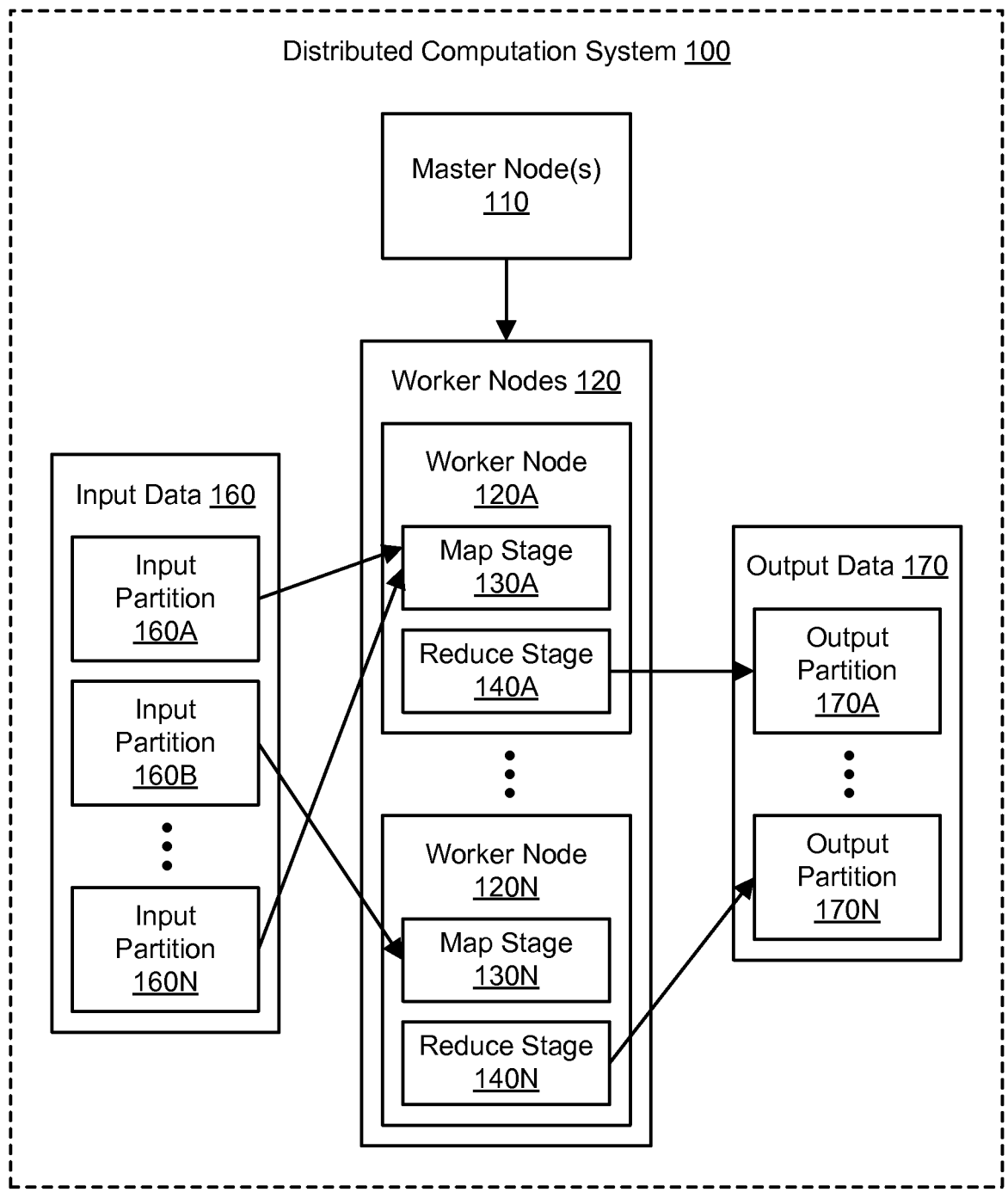
FIG. 1A illustrates an example system environment for performing MapReduce optimization for partitioned intermediate output, according to one embodiment.

FIG. 1A illustrates an example system environment for performing MapReduce optimization for partitioned intermediate output, according to one embodiment. The example system environment may implement a distributed computation system 100. The distributed computation system 100 may include one or more master nodes 110 and a plurality of worker nodes 120 such as worker nodes 120A-120N. The master node(s) 110 may represent one or more coordinator processes that coordinate computations performed by the worker nodes 120. The worker nodes may also be referred to herein as "worker hosts," "workers," or "hosts." The distributed computation system 100 may use one or more networks or interconnections to couple the various components. Elements of the distributed computation system 100 may be located in any suitable location relative to one another, from being virtual compute instances hosted on the same computing hardware to being different physical compute instances hosted in the same data center to being geographically remote. In some embodiments, the master node(s) 110 and worker nodes 120 may implement a MapReduce architecture in which the worker nodes perform similar tasks concurrently under the direction of the master node(s). However, it is contemplated that the distributed computation system 100 may implement other types of distributed computation architectures instead of or in addition to MapReduce.

Using the distributed computation system 100, a set of input data 160 may be processed by the worker nodes 120 to produce a set of output data 170. The input data 160 may be split into a plurality of partitions, such as input partitions 160A and 160B through 160N. One or more of the partitions of the input data 160 may be assigned to each of the worker nodes 120. The input data 160 may be split into partitions on any suitable basis. For example, partition boundaries may be based on the boundaries between individual records, individual lines of data, etc. An individual partition may include elements of input data, such as related items or families of items, that are intended to be processed together by a single worker node. Although three partitions 160A, 160B, and 160N are illustrated for purposes of example, it is contemplated that any suitable number of partitions of input data may be processed using the distributed computation system 100. The assignment of individual partitions to individual worker nodes as shown in FIG. 1A is presented for purposes of example and illustration; it is contemplated that any suitable assignment of individual partitions to individual worker nodes may be used with the distributed computation system 100.

In one embodiment, the master node(s) 110 may provide individual partition(s) of the input data 160 to individual worker nodes, e.g., by performing aspects of the partitioning of the input data and/or aspects of the assignment of individual partitions to individual worker nodes. In one embodiment, the master node(s) 110 may send data indicative of partition assignments to individual worker nodes, and each worker node may acquire its one or more partitions of input data using any suitable technique. For example, a worker node may read a portion of the input data from one or more files or storage locations in one or more storage devices that are accessible to the worker nodes, e.g., over a network. Alternatively, the master node(s) 110 may directly send the relevant partition(s) to individual worker nodes using a network. In various embodiments, the partition(s) of input data to be processed using a particular worker node may be loaded into memory at the particular worker node either partially or entirely before the processing of the partition(s) is initiated.

Each of the worker nodes 120 may perform any suitable processing tasks to generate one or more partitions of the output data 170 based on one or more partitions of the input data 160. In one embodiment, the processing tasks implemented using the worker nodes 120 may be provided by the master node(s) 110, e.g., by sending program code to the worker nodes or instructing the worker nodes to load the program code from one or more storage locations. At least a portion of the processing tasks performed by the worker nodes 120 may be performed concurrently, i.e., in parallel relative to each other. In some embodiments, each of the worker nodes 120 may perform similar tasks and/or implement similar algorithms to process its partition(s) of the input data. As a result of the processing of the input data 160, each of the worker nodes 120 may produce one or more partitions of output data 170. Although two output partitions 170A and 170N are illustrated for purposes of example, it is contemplated that any suitable number of output partitions may be generated using the distributed computation system 100. As they are produced by the worker nodes 120, the output partitions 170A-170N may be stored in one or more storage locations on one or more storage devices that are accessible to the worker nodes. The output partitions 170A-170N may also be referred to as final output data. In one embodiment, the output partitions 170A-170N may be further processed by the master node(s), e.g., by aggregating or concatenating the individual partitions into a single output file.

As will be described in greater detail below, the distributed computation system 100 may implement an optimized MapReduce system in which the use of network resources is minimized during the processing of the input data 160 using the worker nodes 120. The computation performed by each of the worker nodes 120 may include multiple stages of computation, such as a first stage and a second stage. The first stage may be a map stage, such as map stage 130A performed by worker node 120A and map stage 130N performed by worker node 120N. The second stage may be a reduce stage, such as reduce stage 140A performed by worker node 120A and reduce stage 140N performed by worker node 120N. In one embodiment, the map stage may include any computation(s) to generate intermediate output based on the input data 160. In one embodiment, the intermediate output may be partitioned but not necessarily sorted. As used herein, the term "partitioned" indicates that related elements of data are grouped together into partitions. Typically, the elements of data in a particular partition are intended to be processed using the same host. In one embodiment, the reduce stage may include any computation(s) to generate final output 170 based on the intermediate output. For example, the reduce stage may aggregate elements of the data produced by the map stage. Examples of map and reduce computations using the distributed computation system 100 are discussed below with respect to FIGS. 3A-3C. Contrary to conventional MapReduce implementations, the intermediate output may be kept on the same worker node that produced it and used as input for the reduce stage of computation on the same worker node. Accordingly, the distributed computation system 100 may avoid the time and expense of re-partitioning and network data transfer associated with a conventional shuffle from the map stage to the reduce stage.

It is contemplated that the distributed computation system 100 may include additional components not shown, fewer components than shown, or different combinations, configurations, or quantities of the components shown. Although two worker nodes 120A and 120N are illustrated for purposes of example, it is contemplated that any suitable number of worker nodes may be used in conjunction with the distributed computation system 100. Although one master node 110 is illustrated for purposes of example, it is contemplated that any suitable number of master nodes 110 may be used in conjunction with the distributed computation system 100. In some embodiments, any of the worker nodes 120 and/or master node(s) 110 may be implemented as virtual compute instances or as physical compute instances. One or more virtual compute instances may be implemented by the example computing device 3000 illustrated in FIG. 5. The distributed computation system 100 may include one or more computing devices, any of which may also be implemented by the example computing device 3000 illustrated in FIG. 5. In various embodiments, the functionality of the different components of the distributed computation system 100 may be provided by the same computing device or by different computing devices. If any of the various components are implemented using different computing devices, then the respective computing devices may be communicatively coupled, e.g., via one or more networks. Each component of the distributed computation system 100 may represent any combination of software and hardware usable to perform their respective functions, as discussed as follows.

In one embodiment, the distributed computation system 100 may manage the allocation of network-accessible resources. Networks set up by an entity such as a company or a public sector organization to provide one or more services (such as various types of cloud-based computing or storage) accessible via the Internet and/or other networks to a distributed set of clients may be termed provider networks. A provider network may include numerous data centers hosting various resource pools, such as collections of physical and/or virtualized computer servers, storage devices, networking equipment and the like, that are used to implement and distribute the infrastructure and services offered by the provider. The resources may, in some embodiments, be offered to clients in units called "instances," such as virtual or physical compute instances or storage instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network in different embodiments, including general purpose or special purpose computer servers, storage devices, network devices, and the like.

In one embodiment, operators of provider networks may implement a flexible set of resource reservation, control, and access interfaces for their clients. For example, a provider network may implement a programmatic resource reservation interface (e.g., via a web site or a set of web pages) that allows clients to learn about, select, purchase access to, and/or reserve resource instances. In one embodiment, resources may be reserved on behalf of clients using a client-accessible service that implements the distributed computation system 100. According to one such embodiment, the distributed computation system 100 in such an environment may receive a specification of one or more tasks to be performed for a client, along with a set of input data or an indication of a source of input data to be used by the task(s). In response, the distributed computation system 100 may determine an execution plan for implementing the task(s) using one or more resources of a selected resource pool of the provider network. In one embodiment, the resource pool may be automatically selected based on the anticipated computational needs of the various tasks. In one embodiment, the resource pool may be selected based on a specific resource request or reservation submitted by the client. The distributed computation system 100 may schedule an execution of the task(s) using the selected resources.

In one embodiment, the client may use one or more suitable interfaces (such as one or more web pages, an application programming interface [API], or a command-line interface [CLI]) to specify the task(s) to be implemented, the input data set, the computing resources to be used, and/or a time at which the task(s) should be initiated. In one embodiment, the client may be able to view the current execution status of the task(s) using the interface(s). In one embodiment, additional information about executed tasks may be available via the interface(s), such as program output, error logs, exception logs, and so on.

Figure 1B:
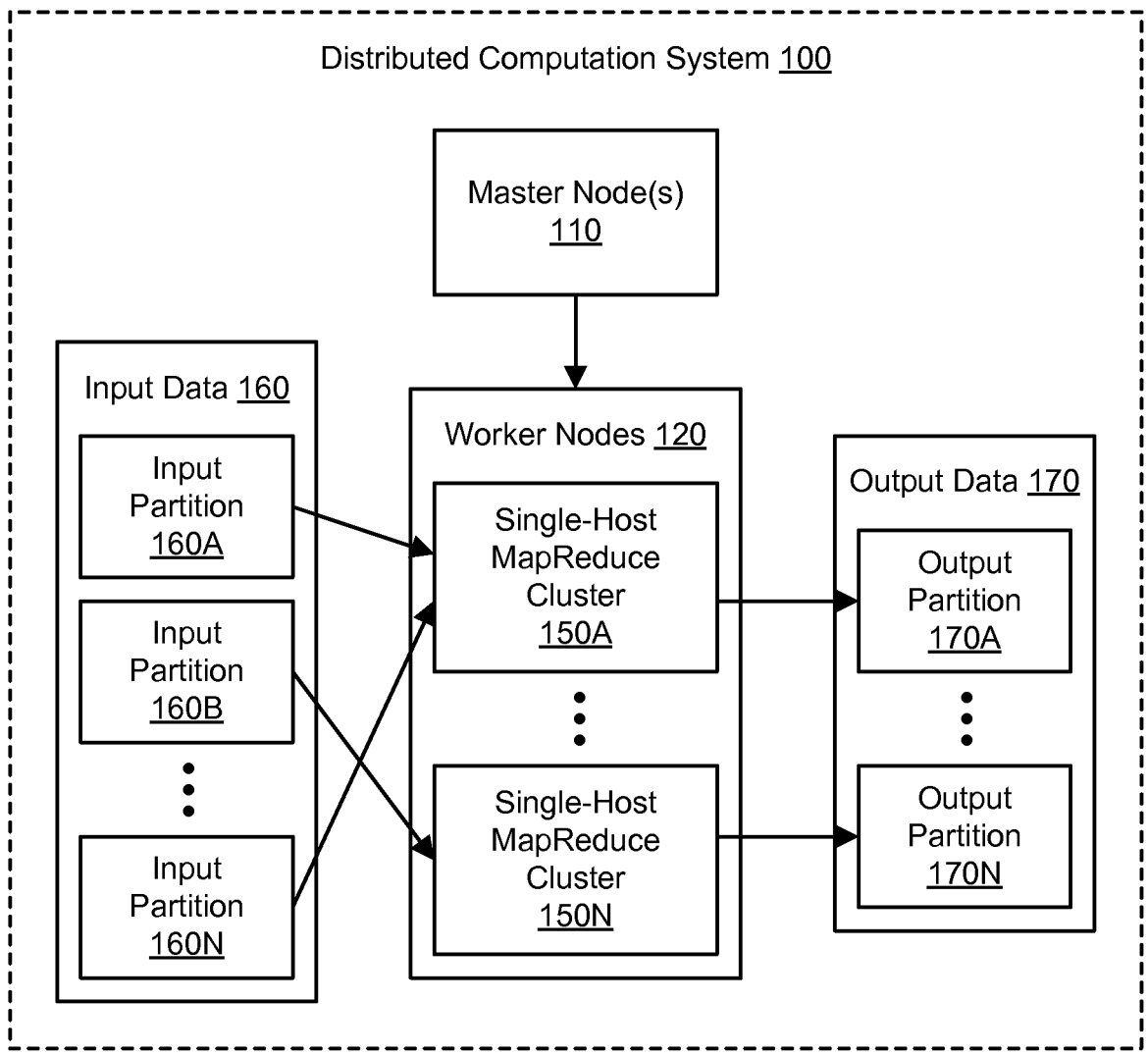
FIG. 1B illustrates further aspects of an example system environment for performing MapReduce optimization for partitioned intermediate output, according to one embodiment.

FIG. 1B illustrates further aspects of an example system environment for performing MapReduce optimization for partitioned intermediate output, according to one embodiment. In one embodiment, each of the worker nodes 120 may be implemented using a single-host MapReduce cluster representing a single host that implements MapReduce. As shown in FIG. 1B, for example, the worker nodes 120 may include single-host MapReduce clusters 150A-150N. Each single-host MapReduce cluster may implement both a map stage of computation and a reduce stage of computation using the same worker host, e.g., the same underlying computing hardware. In one embodiment, the master node(s) 110 may implement the map stage of an initial MapReduce job to split the input data 160 and assign the various input partitions to individual single-host MapReduce clusters. Each single-host MapReduce cluster may then implement a nested MapReduce job to process its portion of the input data 160, e.g., using both the map and reduce stages. The intermediate data produced during the map stage may be kept on the same single-host MapReduce cluster for further processing in the reduce stage. Any suitable implementation of MapReduce may be used for the single-host MapReduce clusters 150A-150N. Although two single-host MapReduce clusters 150A and 150N are illustrated for purposes of example, it is contemplated that any suitable number of single-host MapReduce clusters may be used in conjunction with the distributed computation system 100. Each single-host MapReduce cluster may be implemented by the example computing device 3000 illustrated in FIG. 5.

Figure 2A:
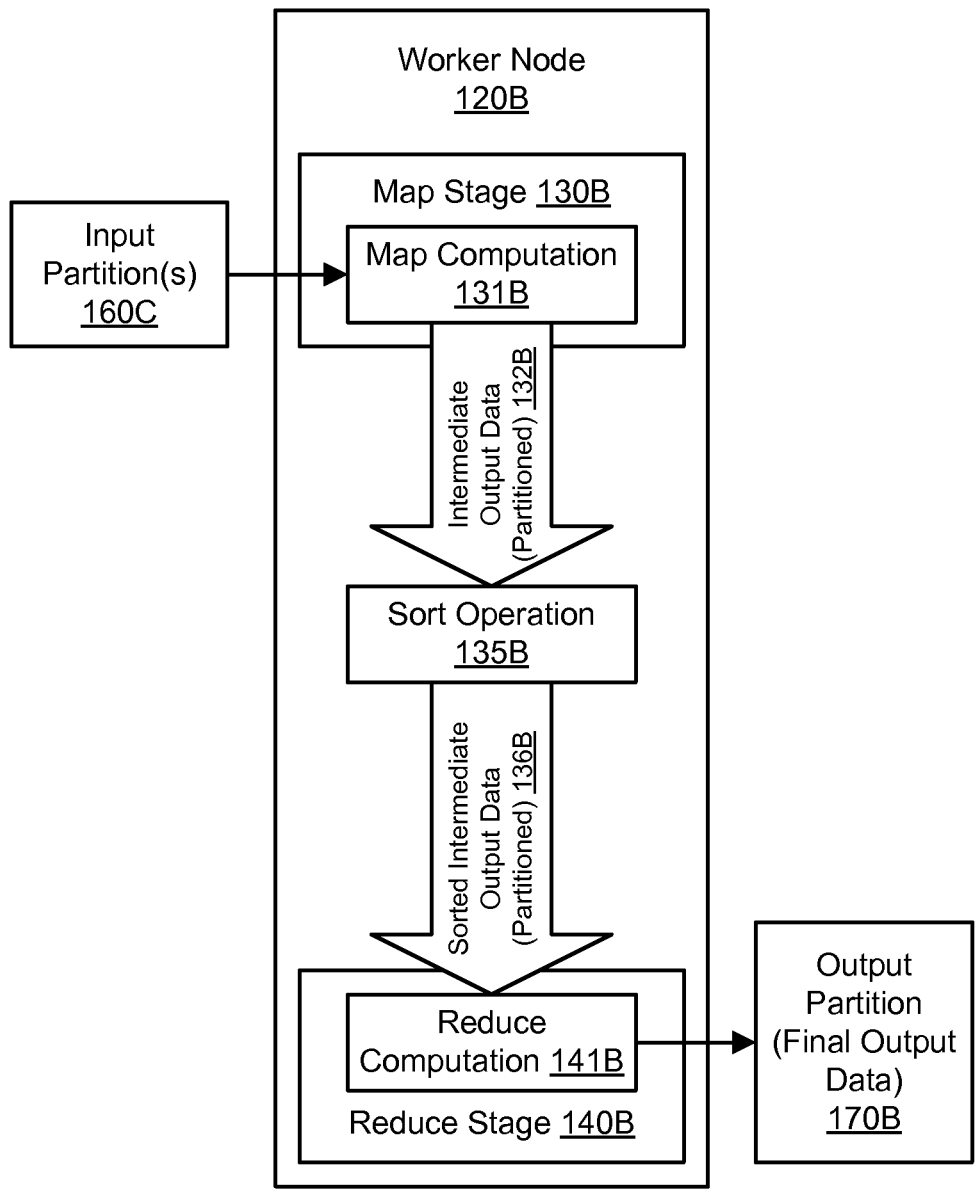
FIG. 2A illustrates a worker node configured for performing MapReduce optimization for partitioned intermediate output, according to one embodiment.

FIG. 2A illustrates a worker node configured for performing MapReduce optimization for partitioned intermediate output, according to one embodiment. A worker node 120B may use one or more input partition(s) 160C as input and produce an output partition (i.e., final output data) 170B. The worker node 120B may be implemented in the same manner as discussed above with respect to worker nodes 120A-120N. The processing of the input partition(s) 160C may include a map stage 130B and a reduce stage 140B performed using the worker node 120B.

The map stage 130B may include a map computation 131B. The map computation 131B may include the execution of program instructions using elements of the input partition(s) 160C as input. The program code used in the map computation 131B may be specified by the master node(s) 110. The map computation 131B may generate intermediate output data 132B. The intermediate output data 132B may be partitioned such that related elements of data are grouped together on the same worker node 120B. The partitioning of the intermediate output data 132B may indicate that the intermediate output data 132B contains related elements of data (e.g., data for items and/or families of items). The partitioning of the intermediate output data 132B may indicate that the elements of data in the intermediate output data 132B may be processed together in the reduce stage 140B, i.e., processed in the reduce stage using a single worker node and without re-partitioning and distribution to multiple worker nodes.

In one embodiment, a sort operation 135B may be performed between the map stage 130B and the reduce stage 140B. The sort operation 135B may sort elements of data in the intermediate output data 132B to produce sorted intermediate output data 136B. The intermediate output data 132B may be sorted based on any suitable key(s) or field(s) of data, such as the key(s) or field(s) of data required by the reduce stage 140B.

The reduce stage 140B may include a reduce computation 141B. The reduce computation 141B may include the execution of program instructions using elements of the intermediate output data 132B or sorted intermediate output data 136B as input. The program code used in the reduce computation 141B may be specified by the master node(s) 110. The reduce computation 141B may generate final output data 170B. In one embodiment, the reduce computation 141B may perform an aggregation of the intermediate output data 132B or sorted intermediate output data 136B. Examples of map and reduce computations using the worker node 120B are discussed below with respect to FIGS. 3A-3C.

Figure 2B:
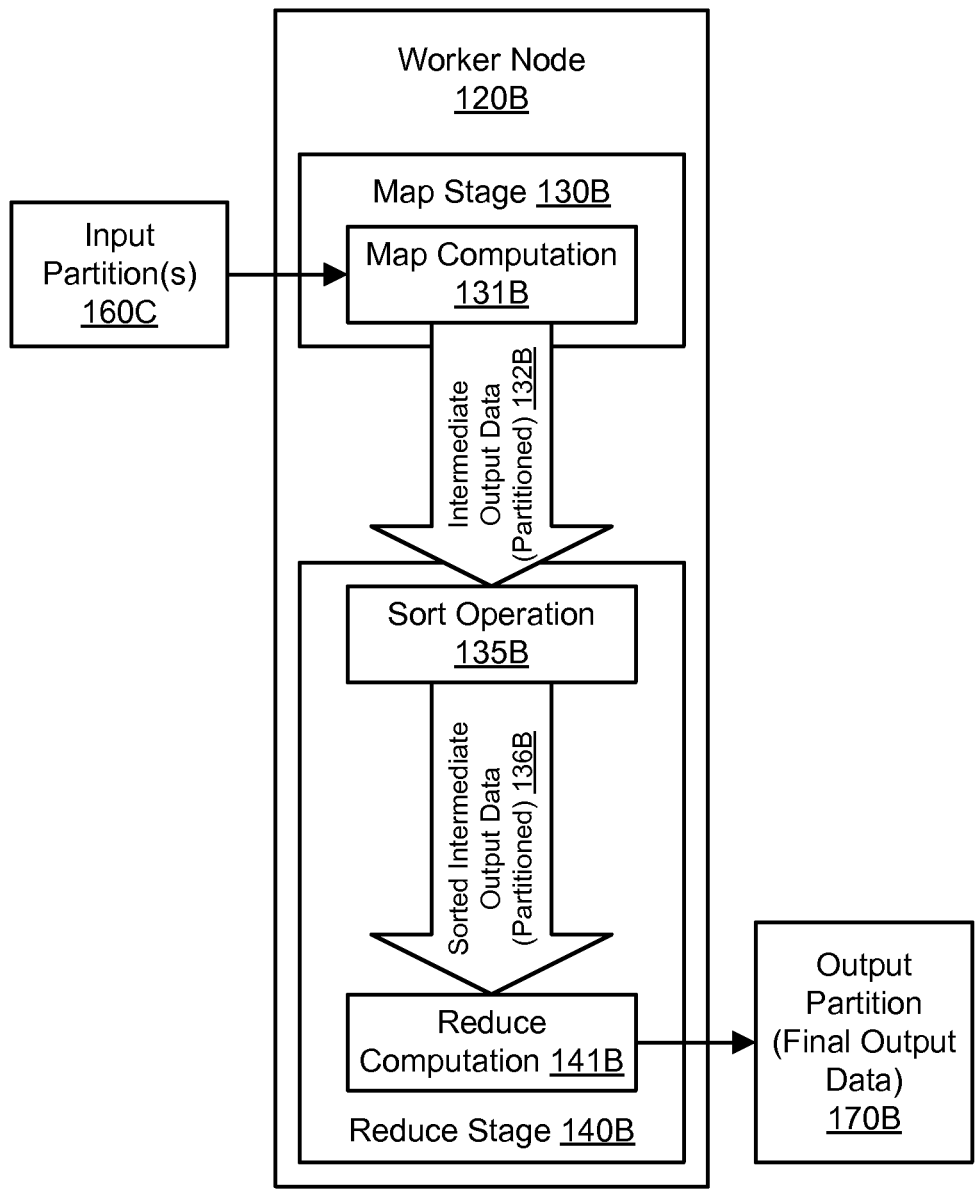
FIG. 2B illustrates further aspects of a worker node configured for performing MapReduce optimization for partitioned intermediate output, according to one embodiment.

FIG. 2B illustrates further aspects of a worker node configured for performing MapReduce optimization for partitioned intermediate output, according to one embodiment. A worker node 120B may be implemented in the same manner as discussed above with respect to FIG. 2A. In one embodiment, however, the sort operation 135B may be performed by the worker node 120B as part of the reduce stage 140B. As discussed above with respect to FIG. 2A, the map stage 130B and reduce stage 140B may be performed using computations executed on the same worker node 120B, and intermediate data 132B or 136B may not be provided to another worker node.

Figure 3A:
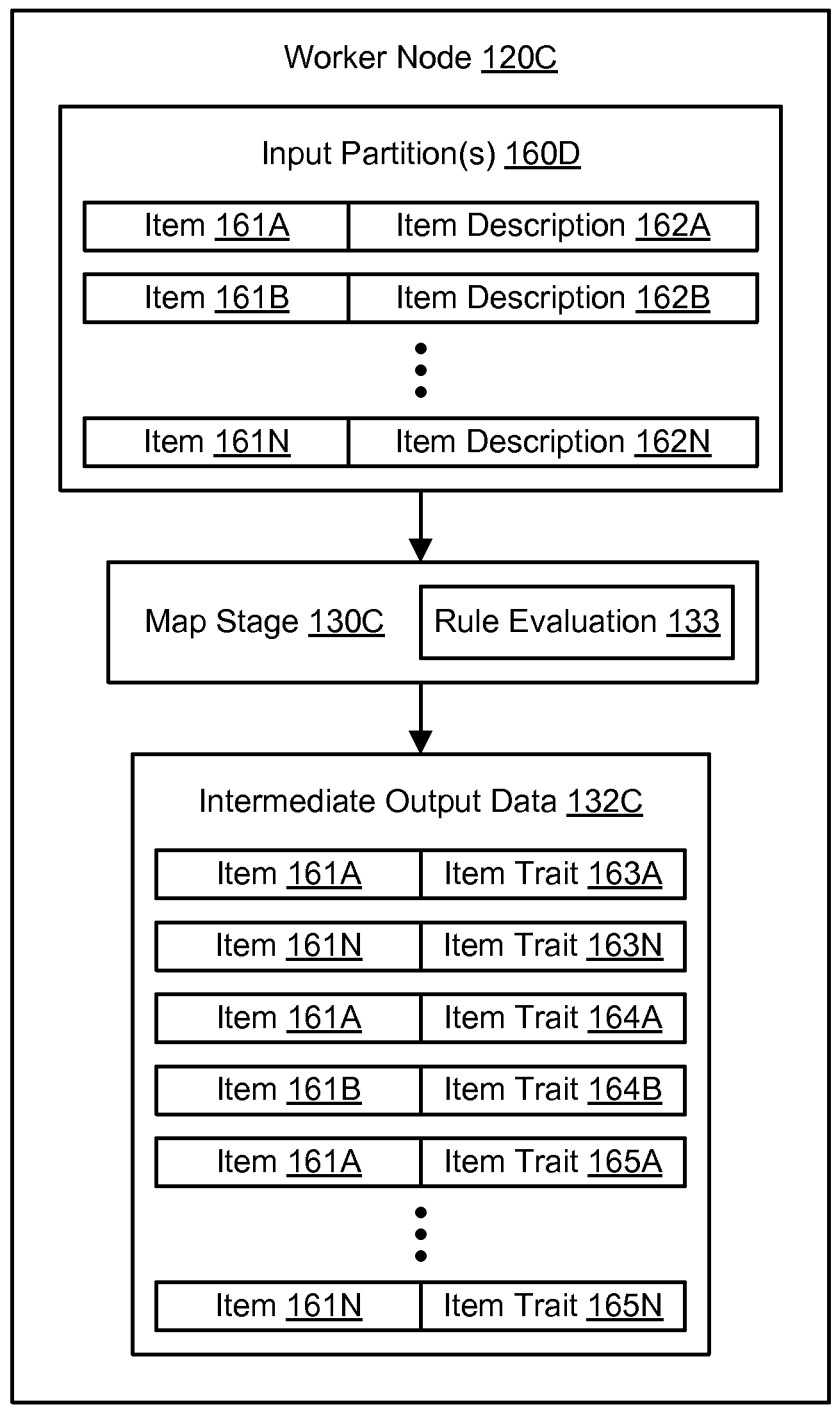
FIG. 3A illustrates the use of a map stage of computation to transform one or more input partitions into partitioned intermediate output data, according to one embodiment.
Figure 3B:
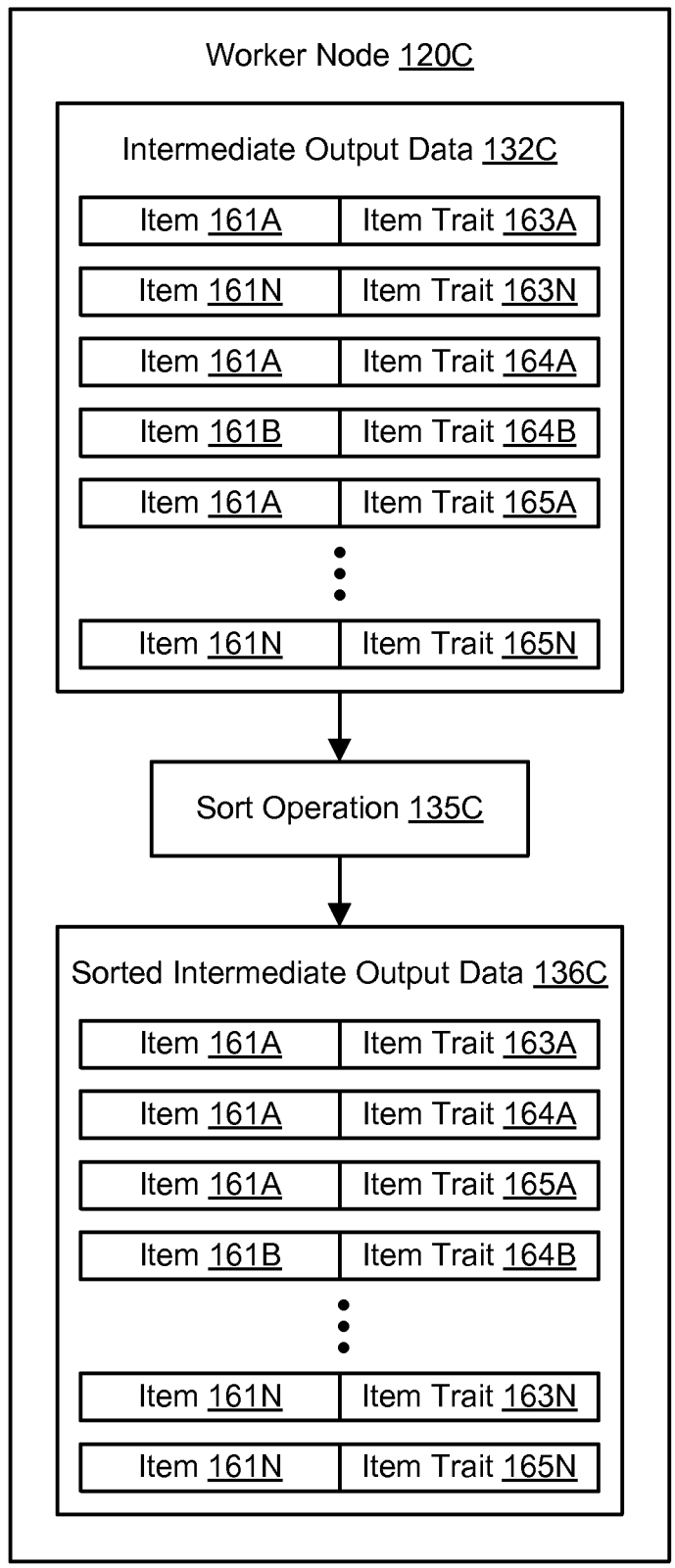
FIG. 3B illustrates the use of a sort operation to transform partitioned intermediate output data into sorted partitioned intermediate output data, according to one embodiment.
Figure 3C:
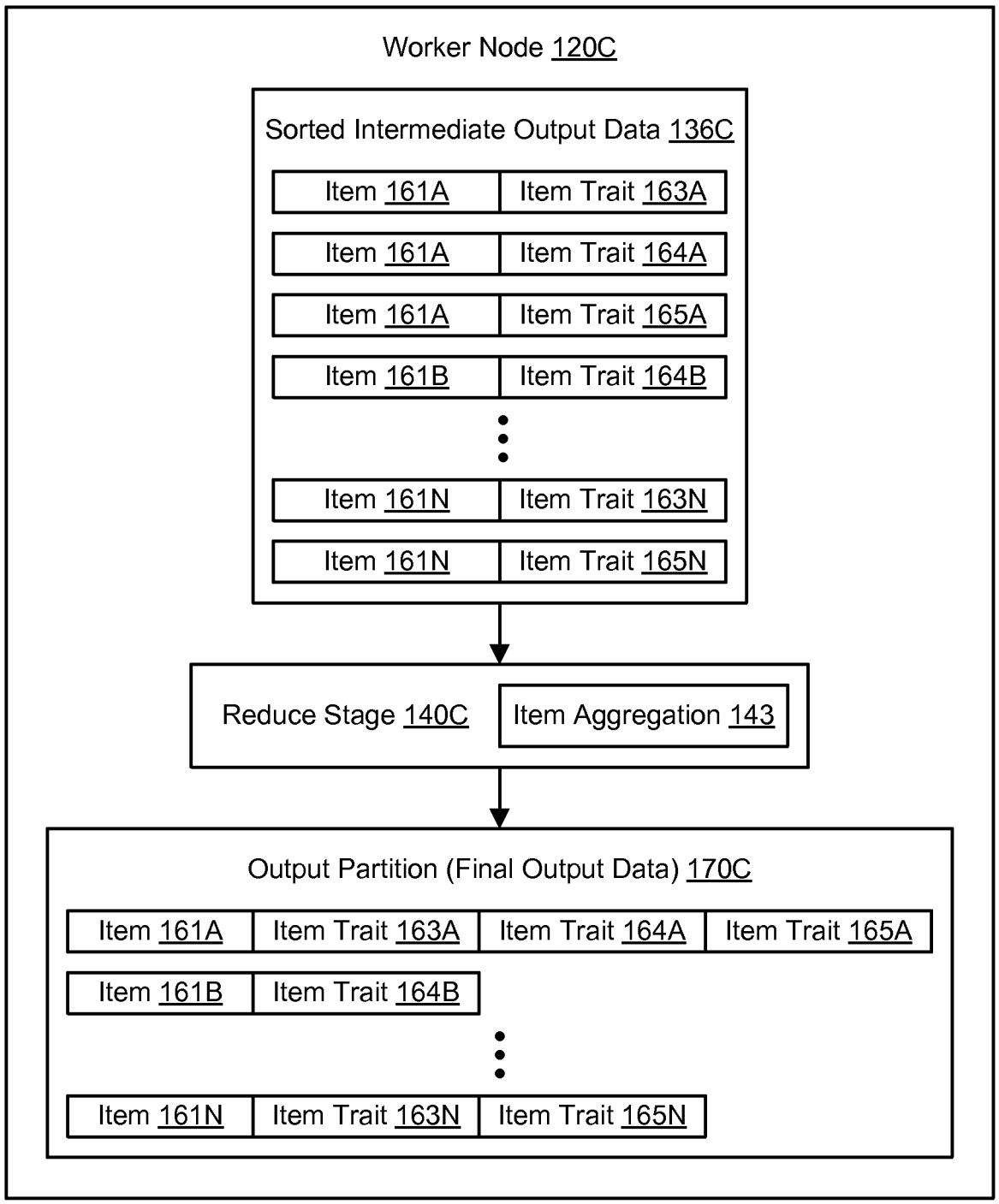
FIG. 3C illustrates the use of a reduce stage of computation to transform sorted partitioned intermediate output data into partitioned final output data, according to one embodiment.

FIGS. 3A-3C illustrate examples of input data, intermediate data, and output data usable with the distributed computation system 100, according to one embodiment. Although FIGS. 3A-3C illustrate one particular worker node, similar operations may be performed on other worker nodes in parallel. FIG. 3A illustrates the use of a map stage of computation to transform one or more input partitions into partitioned intermediate output data, according to one embodiment. A worker node 120C may be implemented in the same manner as discussed above with respect to worker nodes 120A-120N. The worker node 120C may be assigned one or more input partitions 160D by a master node 110. In one embodiment, the input data may represent items and their descriptions. For example, the items may represent items available for sale by an online merchant and/or through an online catalog. The total set of input data may represent many records (e.g., millions or billions), and the total set may be processed efficiently using the distributed computation system 100 to process different partitions of the records in parallel. The input partition(s) 160D may include multiple records or lines, where each record or line includes an identifier of an item and a description of the item. As shown in the example of FIG. 3A, the input partition(s) 160D may include a first item 161A and its item description 162A, a second item 161B and its item description 162B, and a final item 161N and its item description 162N. However, it is contemplated that any suitable number of items or records may be provided as input to the worker node 120C.

The item identifier may be represented by one or more strings and/or numerals that uniquely identify the item within the merchant's system or catalog. For example, an item identifier may include an identifier of the item itself as well as an identifier of a marketplace in which the item is listed for sale. The item description may comprise one or more attributes, e.g., one or more data fields and values for those fields. In general, the item description for items in a merchant catalog may include fields indicating the source of the item (e.g., a manufacturer, distributor, and/or brand), the price of the item, the attributes of the item, the availability of the item, and other suitable elements of metadata. Some of the items may also be grouped together in families. For example, different sizes and/or colors of an item of apparel may be classified in the same variation family.

The map stage 130C implemented by the worker node 120C may include one or more computations for rule evaluation 133. The rule evaluation 133, when executed, may evaluate the items descriptions 162A-162N against one or more rules. The rules may be relatively simple or relatively complex and may be based on any suitable number of attributes of the item descriptions. For example, one rule may be evaluated to determine whether the item description includes a suitable image of the item. The item may be considered defective if it does not include such an image. As another example, an item description that lacks a suitable item image may not be considered defective if another item in the same variation family includes a suitable item image. As yet another example, a more complex rule may be evaluated based on whether the item description includes a Universal Product Code (UPC) and whether the item description includes a brand that requires a UPC in the catalog. If the item's brand requires a UPC and the item does not include a UPC, then the item may be considered defective.

The map stage 130C may produce intermediate output data 132C. The output 132C of the rule evaluation 133 may include any traits discovered through the application of the rules to the item description. The number of traits may vary for each item, e.g., from zero to any suitable number. In one embodiment, each trait may represent a potential defect for an item description in a merchant catalog. As shown in the example of FIG. 3A, the intermediate output data 1322C may include a first trait 163A for the first item 161A, a second trait 164A for the first item, a third trait 165A for the first item 161A, a trait 164B for the second item 161B, and two traits 163N and 165N for the final item 161N. However, it is contemplated that any suitable number and type of elements may be produced as intermediate output data 132C by the worker node 120C.

The intermediate output data 132C may represent each trait and its accompanying item identifier as a separate result, record, or line. In one embodiment, the elements in the intermediate output data 132C may be produced out of order with respect to the item identifiers. For example, the elements may be produced out of order if rules for individual items are evaluated and then rules for variation families are evaluated. As shown in the example of FIG. 3A, at least some of the results in the intermediate output data 132C are out of order with respect to the item identifiers. However, the intermediate output data 132C includes only results for items represented in the input partition(s) 160D. Accordingly, the intermediate output data 132C may be considered partitioned as well.

FIG. 3B illustrates the use of a sort operation to transform partitioned intermediate output data into sorted partitioned intermediate output data, according to one embodiment. As discussed above, the intermediate output data 132C may include elements that are out of order with respect to a particular key or keys, such as the item identifier. The worker node 120C may perform a sort operation 135C to sort the elements of the intermediate output data 132C by a specified key or keys. For example, the sort operation 135C may produce sorted intermediate output data 136C. The sorted intermediate output data 136C may include the same elements as the intermediate output data 132C, but the elements in the sorted intermediate output data 136C are listed in order of the item identifiers. In one embodiment, the sort operation 135C may be performed as part of the reduce stage but before the reduce computation.

FIG. 3C illustrates the use of a reduce stage of computation to transform sorted partitioned intermediate output data into partitioned final output data, according to one embodiment. The reduce stage 140C implemented by the worker node 120C may include one or more computations for item aggregation 143. The item aggregation 143, when executed, may aggregate traits by item and produce individual results for each item. The results may be placed in set of final output data 170C. For example, the item aggregation 143 may produce output in which each item and its associated traits are represented by a single result, record, or line. As shown in the example of FIG. 3C, the final output data 170C may include a first result for the first item 161A and its traits 163A, 164A, and 165A; a second result for the second item 161B and its trait 164B; and a final result for the final item 161N and its traits 163N and 165N. In one embodiment, the item aggregation may also evaluate complex rules, such as rules that require the presence or absence of multiple traits. For example, a more complex rule may be evaluated based on whether the item description includes a Universal Product Code (UPC) and whether the item description includes a brand that requires a UPC in the catalog. If the item's brand requires a UPC and the item does not include a UPC, then the item may be considered defective by the item aggregation computation 143.

Figure 4:
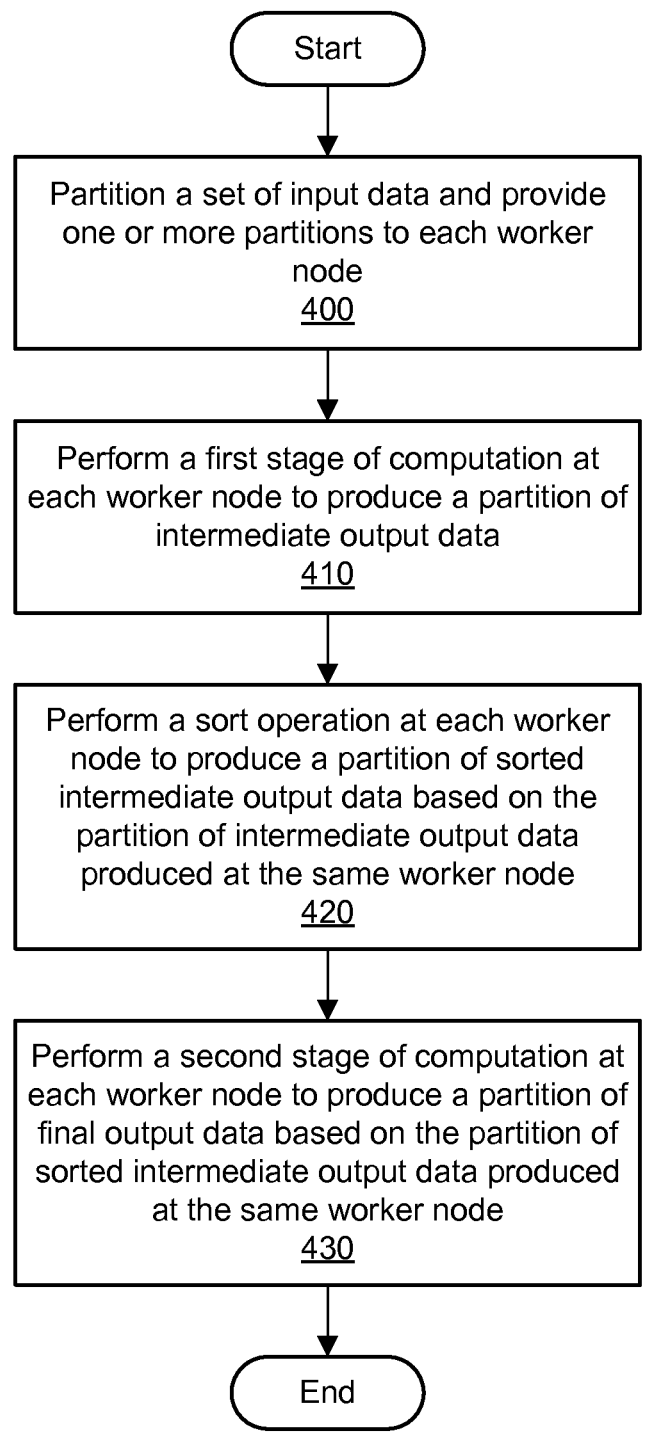
FIG. 4 is a flowchart illustrating a method for performing MapReduce optimization for partitioned intermediate output, according to one embodiment.

FIG. 4 is a flowchart illustrating a method for performing MapReduce optimization for partitioned intermediate output, according to one embodiment. As shown in 400, a set of input data may be partitioned, and one or more of the partitions may be provided to each worker node. Each worker node may implement a single-host MapReduce cluster. In one embodiment, each worker node may perform multiple stages or computation without sending intermediate results to another worker node.

As shown in 410, a first stage of computation may be performed at each worker node. The first stage of computation may produce a partition of intermediate output data at the worker node. The first stage may represent a map stage that implements a map computation. For example, the map computation may include rule evaluation of items in the input partition(s) against a set of rules, and the intermediate output data may include one or more traits for one or more of the items as determined with the rule evaluation.

As shown in 420, a sort operation may be performed at each worker node. Based on the partition of intermediate output data produced at the worker node, the sort operation may produce a partition of sorted intermediate output data at the worker node. As shown in 430, a second stage of computation may be performed at each worker node. Based on the partition of sorted intermediate output data produced at the worker node, the second stage of computation may produce a partition of final output data at the worker node. The second stage may represent a reduce stage that implements a reduce computation. For example, the reduce computation may include item aggregation for various traits determined for items in the map stage. By processing elements of data that belong to the same partition(s) on the same worker node using multiple stages of computation, the time and expense of shuffling intermediate output to one or more other worker nodes may be avoided.

Illustrative Computer System

Figure 5:
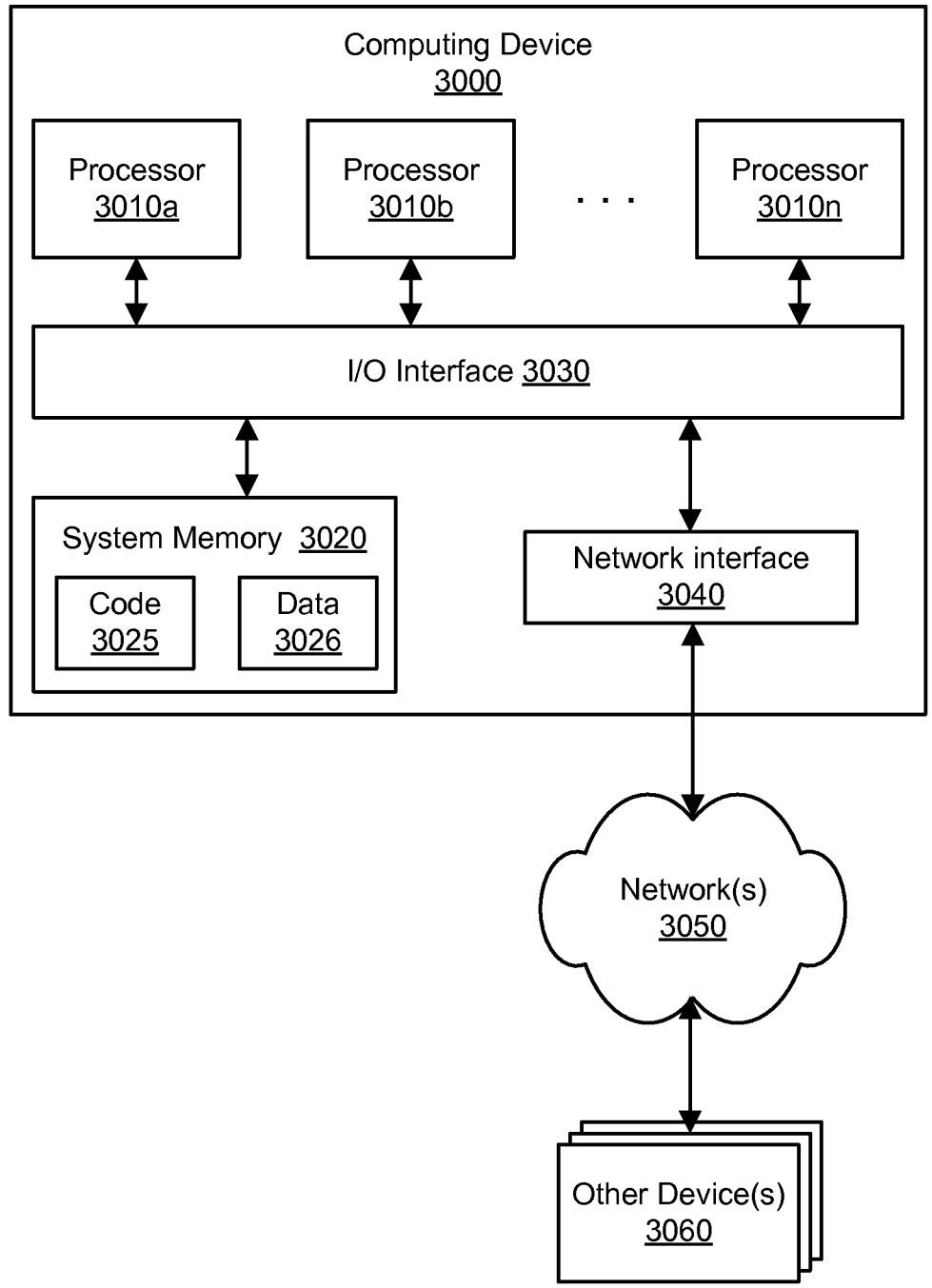
FIG. 5 illustrates an example of a computing device that may be used in some embodiments.

In at least some embodiments, a computer system that implements a portion or all of one or more of the technologies described herein may include a general-purpose computer system that includes or is configured to access one or more computer-readable media. FIG. 5 illustrates such a general-purpose computing device 3000. In the illustrated embodiment, computing device 3000 includes one or more processors 3010a-3010n coupled to a system memory 3020 via an input/output (I/O) interface 3030. Computing device 3000 further includes a network interface 3040 coupled to I/O interface 3030.

In various embodiments, computing device 3000 may be a uniprocessor system including one processor or a multi-processor system including several processors 3010a and 3010b through 3010n (e.g., two, four, eight, or another suitable number), referred to collectively as processors 3010. Processors 3010 may include any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store program instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc, that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 5 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices, and is not limited to these types of devices.

Various embodiments may further include receiving, sending, or storing instructions and/or data implemented in accordance with the foregoing description upon a computer-readable medium. Generally speaking, a computer-readable medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-readable medium may also include transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. In various of the methods, the order of the steps may be changed, and various elements may be added, reordered, combined, omitted, modified, etc. Various of the steps may be performed automatically (e.g., without being directly prompted by user input) and/or programmatically (e.g., according to program instructions).

Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
   a plurality of computing devices configured to implement a distributed MapReduce computation system comprising one or more master nodes and a plurality of worker nodes, wherein the one or more master nodes are configured to:
   divide a set of input data into a plurality of subsets of the input data; and
   provide a respective subset of the input data to each of the plurality of worker nodes; and
   wherein each worker node of the plurality of worker nodes is configured to:
   perform, by the worker node, a first stage of computation on the respective subset of the input data provided to the worker node, wherein the first stage of computation comprises a Map operation, wherein the first stage of computation produces a respective set of intermediate output data,
   wherein the first stage of computation performed by the worker node generates a partitioning of the set of intermediate output data, wherein the partitioning indicates that the intermediate output data contains a group of data elements related to each other that are to be processed together using a Reduce operation of the same worker node without re-partitioning the group of data elements and without distributing the group of data elements to other worker nodes of the plurality of worker nodes;
   perform, by the worker node, a sort operation on the respective set of intermediate output data, wherein the sort operation produces a respective set of sorted intermediate output data; and
   perform, by the worker node, a second stage of computation on the respective set of sorted intermediate output data, wherein the second stage of computation comprises the Reduce operation, wherein the second stage of computation produces a respective set of final output data, and wherein the worker node transfers the intermediate output data to the sort operation of the same worker node and transfers the sorted intermediate output data to the Reduce operation of the same worker node without use of the one or more master nodes to transfer the intermediate and sorted intermediate output data to the same worker node.

2. The system as recited in claim 1, wherein each worker node of the worker nodes is further configured to:
   provide the respective set of sorted intermediate output data to the second stage of computation without sending the respective set of intermediate output data or the respective set of sorted intermediate output data to another one of the worker nodes.

3. The system as recited in claim 1, wherein each worker node comprises a single-host MapReduce cluster.

4. A computer-implemented method, comprising:
   distributing a plurality of partitions of input data among a plurality of worker nodes comprising a plurality of single-host MapReduce clusters;
   performing a first stage of computation on the plurality of partitions of input data using the plurality of single-host MapReduce clusters, wherein the first stage of computation comprises a Map operation, and wherein, for individual ones of the single-host MapReduce clusters, the first stage of computation produces a respective partition of intermediate output data based on a respective partition of the input data distributed to a respective worker node that comprises the single-host MapReduce cluster,
   wherein the partitioning of the intermediate output data indicates that the intermediate output data contains a group of data elements related to each other that are to be processed together using a Reduce operation of the same respective worker node without re-partitioning the group of data elements and without distributing the group of data elements to other worker nodes of the plurality of worker nodes;
   performing a sort operation on the respective partitions of intermediate output data using the plurality of worker nodes, wherein, for the individual ones of the single-host MapReduce clusters, the sort operation produces a respective partition of sorted intermediate output data based on the respective partition of intermediate output data produced at the respective worker node that comprises the single-host MapReduce cluster; and performing a second stage of computation on the respective partitions of sorted intermediate output data using the plurality of single-host MapReduce clusters, wherein the second stage of computation comprises the Reduce operation, and wherein, for the individual ones of the single-host MapReduce clusters, the second stage of computation produces a respective partition of final output data based on the respective partition of sorted intermediate output data produced at the respective worker node that comprises the single-host MapReduce cluster, and wherein the respective worker node transfers the intermediate output data to the sort operation of the same worker node and transfers the sorted intermediate output data to the Reduce operation of the same worker node without use of a master node to transfer the intermediate and sorted intermediate output data to the same worker node.

5. The method as recited in claim 4, wherein the respective partition of sorted intermediate output data is provided to the second stage of computation without sending the respective partition of intermediate output data from an individual one of the single-host MapReduce clusters to another one of the single-host MapReduce clusters.

6. The method as recited in claim 4, wherein the respective partition of sorted intermediate output data is provided to the second stage of computation without use of a network.

7. The method as recited in claim 4, wherein the second stage of computation comprises an aggregation of the respective partition of sorted intermediate output data into the respective partition of final output data.

8. The method as recited in claim 7, wherein the aggregation of the respective partition of sorted intermediate output data comprises aggregating a plurality of records that correspond to at least one item of the respective partition of sorted intermediate output data to produce a single record for the at least one item.

9. A non-transitory computer-readable storage medium storing program instructions computer-executable to perform:

dividing a set of input data into a plurality of partitions of the input data;

assigning a respective one or more partitions of the input data to each worker host of a plurality of worker hosts;

for individual ones of the plurality of worker hosts, performing a first stage of computation on the respective one or more partitions of the input data, wherein the first stage of computation comprises a Map operation, and wherein the first stage of computation produces a respective one or more partitions of intermediate output data, wherein the partitioning of the intermediate output data indicates that the intermediate output data contains a group of data elements related to each other that are to be processed together using a Reduce operation of the same worker host without re-partitioning the group of data elements and without distributing the group of data elements to other worker hosts of the plurality of worker hosts;

for individual ones of the plurality of worker hosts, performing a sort operation on the respective one or more partitions of intermediate output data produced by the worker host, wherein the sort operation produces a respective one or more partitions of sorted intermediate output data; and for individual ones of the plurality of worker hosts, performing a second stage of computation on the respective one or more partitions of sorted intermediate output data produced by the worker host, wherein the second stage of computation comprises the Reduce operation, and wherein the second stage of computation produces a respective one or more partitions of final output data, and wherein the worker host transfers the intermediate output data to the sort operation of the same worker host and transfers the sorted intermediate output data to the Reduce operation of the same worker host without use of a master node to transfer the intermediate and sorted intermediate output data to the same worker host.

10. The non-transitory computer-readable storage medium as recited in claim 9, wherein the respective one or more partitions of intermediate output data are provided to the sort operation without sending the respective one or more partitions of intermediate output data from an individual one of the worker hosts to another one of the worker hosts, and wherein the respective one or more partitions of sorted intermediate output data are provided to the second stage of computation without sending the respective one or more partitions of sorted intermediate output data from an individual one of the worker hosts to another one of the worker hosts.

11. The non-transitory computer-readable storage medium as recited in claim 9, wherein the respective one or more partitions of intermediate output data are provided to the sort operation without use of a network, and wherein the respective one or more partitions of sorted intermediate output data are provided to the second stage of computation without use of the network.

12. The non-transitory computer-readable storage medium as recited in claim 9, wherein each worker host comprises a single-host MapReduce cluster.

13. The non-transitory computer-readable storage medium as recited in claim 9, wherein the second stage of computation comprises an aggregation of the sorted intermediate output data into the final output data.

14. A system, comprising:

a plurality of single-host MapReduce clusters, wherein each of the single-host MapReduce clusters comprises at least one respective processor and a respective memory coupled to the at least one respective processor, wherein the respective memory stores respective program instructions, and wherein, for each single-host MapReduce cluster of the plurality of single-host MapReduce clusters, the respective program instructions are executable by the at least one respective processor to:

implement, by the single-host MapReduce cluster, a first stage of computation on a respective partition of input data, wherein the first stage of computation comprises a Map operation, and wherein the first stage of computation produces a respective partition of intermediate output data, wherein the partitioning of the intermediate output data indicates that the intermediate output data contains a group of data elements related to each other that are to be processed together using a Reduce operation of the same single-host MapReduce cluster without re-partitioning the group of data elements and without distributing the group of data elements to other single-host MapReduce clusters of the plurality of single-host MapReduce clusters;

implement, by the single-host MapReduce cluster, a sort operation on the respective partition of intermediate output data, wherein the sort operation produces a respective partition of sorted intermediate output data; and implement, by the single-host MapReduce cluster, a second stage of computation on the respective partition of sorted intermediate output data, wherein the second stage of computation comprises the Reduce operation, and wherein the second stage of computation produces a respective partition of final output data, and wherein the single-host MapReduce cluster transfers the intermediate output data to the sort operation of the same single-host MapReduce cluster and transfers the sorted intermediate output data to the Reduce operation of the same single-host MapReduce cluster without use of a master node to transfer the intermediate and sorted intermediate output data to the same single-host MapReduce cluster.

15. The system as recited in claim 14, wherein each of the single-host MapReduce clusters further comprises:

a respective network interface;

wherein, for each of the single-host MapReduce clusters, the respective partition of input data is received using the respective network interface;

wherein, for each of the single-host MapReduce clusters, the respective partition of intermediate output data is provided to the sort operation without using the respective network interface; and wherein, for each of the single-host MapReduce clusters, the respective partition of sorted intermediate output data is provided to the second stage of computation without using the respective network interface.

16. The system as recited in claim 14, further comprising: one or more master nodes configured to:

generate the respective partitions of input data based on a set of input data; and assign individual ones of the respective partitions of input data to individual ones of the single-host MapReduce clusters.

17. The system as recited in claim 14, wherein, for individual ones of the single-host MapReduce clusters, the second stage of computation comprises an aggregation of the respective partition of sorted intermediate output data into the respective partition of final output data.

18. The system as recited in claim 14, wherein, for each of the single-host MapReduce clusters, the respective program instructions are executable by the at least one respective processor to:

provide the respective partition of final output data to a master node that coordinates computations performed by each of the single-host MapReduce clusters to generate a set of output data that comprises each respective partition of final output data produced by each of the single-host MapReduce clusters.

\* \* \* \* \*